US012623427B2

(12) United States Patent
Kinnan et al.

(10) Patent No.: US 12,623,427 B2
(45) Date of Patent: May 12, 2026

(54) POWDER FEEDING DEVICE

(71) Applicants: NGK INSULATORS, LTD., Nagoya (JP); NGK KILNTECH, CORPORATION, Nagoya (JP)

(72) Inventors: Taiki Kinnan, Nagoya (JP); Michihiro Ito, Nagoya (JP); Takanori Isono, Nagoya (JP)

(73) Assignees: NGK INSULATORS, LTD., Nagoya (JP); NGK KILNTECH, CORPORATION, Nagoya (JP)

( * ) Notice: Subject to any disclaimer, the term of this patent is extended or adjusted under 35 U.S.C. 154(b) by 78 days.

(21) Appl. No.: 18/825,148

(22) Filed: Sep. 5, 2024

(65) Prior Publication Data

US 2024/0424757 A1 Dec. 26, 2024

Related U.S. Application Data

(63) Continuation of application No. PCT/JP2023/016889, filed on Apr. 28, 2023.

(30) Foreign Application Priority Data

May 2, 2022 (JP) ................................. 2022-076143

(51) Int. Cl.
B30B 15/02 (2006.01)
B30B 15/30 (2006.01)
(Continued)

(52) U.S. Cl.
CPC .......... B30B 15/022 (2013.01); B30B 15/304 (2013.01); C04B 35/626 (2013.01); *Y02E 60/10* (2013.01)

(58) Field of Classification Search
CPC ...... B30B 15/022; F27D 5/0012; B29C 43/00
See application file for complete search history.

(56) References Cited

FOREIGN PATENT DOCUMENTS

CN 210036297 U 2/2020
CN 214490733 U 10/2021
(Continued)

OTHER PUBLICATIONS

English translation of the Written Opinion of the International Search Authority dated Jul. 18, 2023 (Application No. PCT/JP2023/016889).

(Continued)

*Primary Examiner* — Atul P. Khare
(74) *Attorney, Agent, or Firm* — BURR PATENT LAW, PLLC

(57) ABSTRACT

A powder feeding device configured to fill a saggar with powder by compressing the powder thereinto may include: a pressing plate configured to compress the powder in the saggar; and a pressing mechanism configured to press the pressing plate toward the powder in the saggar. The pressing plate may include a compression plate including a pressing surface that compresses the powder by contacting the powder; and a plurality of slit plates disposed on the pressing surface and extending downward from the pressing surface. The slit plates may be arranged radially as the powder feeding device with the saggar placed therein is viewed from above. When the saggar is placed in the powder feeding device, distances between the slit plates and a sidewall of the saggar may be substantially equal and the distances between the slit plates and the sidewall of the saggar may be 30 mm or less.

10 Claims, 9 Drawing Sheets

(51) Int. Cl.
C04B 35/626 (2006.01)
H01M 4/36 (2006.01)

(56) References Cited

FOREIGN PATENT DOCUMENTS

| JP | 5460453 B2 | 4/2014 |
| JP | 2014-172100 A | 9/2014 |
| JP | 2015-218098 A | 12/2015 |
| JP | 2017-206002 A | 11/2017 |
| JP | 2020-070232 A | 5/2020 |

OTHER PUBLICATIONS

International Search Report and Written Opinion (Application No. PCT/JP2023/016889) dated Jul. 18, 2023 (11 pages).

FIG. 4

| Distance L Between Slit Plate and Saggar (mm) | Homogeneousness of Powder after Firing |
|---|---|
| 1 | ○ |
| 2 | ○ |
| 5 | ○ |
| 10 | ○ |
| 20 | △ |
| 30 | △ |
| 40 | × |

FIG. 5

| Thickness of Slit Plate (mm) | Homogeneousness of Powder after Firing | Pressing Force | Overall Evaluation |
|---|---|---|---|
| 0.3 | × | ○ | × |
| 0.5 | △ | ○ | ○ |
| 1 | ○ | ○ | ◎ |
| 2 | ○ | ○ | ◎ |
| 2.5 | ○ | ○ | ◎ |
| 3 | ○ | ○ | ◎ |
| 4 | ○ | △ | ○ |
| 5 | ○ | × | × |

FIG. 7

| Taper Angle α (degree) | Abrasion Resistance | Pressing Force | Overall Evaluation |
|---|---|---|---|
| 10 | × | ○ | × |
| 20 | △ | ○ | ○ |
| 25 | △ | ○ | ○ |
| 30 | ○ | ○ | ◎ |
| 45 | ○ | ○ | ◎ |
| 60 | ○ | ○ | ◎ |
| 75 | ○ | ○ | ◎ |
| 85 | ○ | ○ | ◎ |
| 88 | ○ | △ | ○ |
| 90 (Without Taper) | ○ | △ | ○ |

| Taper Angle β (degree) | Abrasion Resistance | Pressing Force | Overall Evaluation |
|---|---|---|---|
| 10 | × | ○ | × |
| 20 | △ | ○ | ○ |
| 25 | △ | ○ | ○ |
| 30 | ○ | ○ | ◎ |
| 60 | ○ | ○ | ◎ |
| 90 | ○ | ○ | ◎ |
| 120 | ○ | ○ | ◎ |
| 150 | ○ | ○ | ◎ |
| 170 | ○ | ○ | ◎ |
| 175 | ○ | △ | ○ |
| 180 (Without Taper) | ○ | △ | ○ |

POWDER FEEDING DEVICE

REFERENCE TO RELATED APPLICATION

This application claims priority to Japanese Patent Application No. 2022-076143 filed on May 2, 2022. The entire content of the priority application is incorporated herein by reference.

TECHNICAL FIELD

The art disclosed herein relates to a powder feeding device configured to fill a saggar with powder.

BACKGROUND ART

For example, when a raw powder material used for an electronic product is to be fired, the powder is supplied into a saggar and then fired. In order to improve the productivity of powder firing, the powder is compressed when supplied into the saggar so that the saggar is filled with the powder more efficiently. However, this may make it hard to remove the sintered powder from the saggar since the powder was compressed and thus densely packed in the saggar. For example, Japanese Patent Application Publication No. 2015-218098 describes a powder feeding device that supplies powder into a saggar by compressing the powder thereinto. The powder feeding device of Japanese Patent Application Publication No. 2015-218098 includes a pressing plate that compresses the powder. The pressing plate includes a plurality of slit plates extending downward from the pressing plate which compresses the powder. The slit plates of the pressing plate form slit grooves in a powder compact formed by filling the saggar with the powder. This facilitates removal of the sintered powder from the saggar after firing. The slit plates are in the same shape and arranged radially as the powder feeding device is viewed from above.

SUMMARY

In the powder feeding device of Japanese Patent Application Publication No. 2015-218098, the slit plates are arranged radially from the center of the pressing plate. When the powder is compressed by the pressing plate, since the slit plates all have the same shape, the slit plates are not positioned near the four corners of the saggar, which is square as viewed from above. That is, the slit grooves are not formed near the four corners of the saggar. This lack of slit grooves in the powder compact formed by filling the saggar with the powder may hinder gases required for firing reactions from reaching deep inside the powder compact and may also hinder reaction gases generated during the firing from escaping. With the powder feeding device of Japanese Patent Application Publication No. 2015-218098, the reaction gases are less likely to escape from near the four corners of the saggar than from near a center portion thereof. Due to this, the powder in the saggar may be fired homogeneously.

The disclosure herein provides a technology that allows powder in a saggar to be homogeneously fired.

In a first aspect of the technology disclosed herein, a powder feeding device is configured to fill a saggar with powder by compressing the powder thereinto. The powder feeding device may comprise: a pressing plate configured to compress the powder in the saggar; and a pressing mechanism configured to press the pressing plate toward the powder in the saggar. The pressing plate may comprise a compression plate including a pressing surface that compresses the powder by contacting the powder; and a plurality of slit plates disposed on the pressing surface and extending downward from the pressing surface. The slit plates may be arranged radially as the powder feeding device with the saggar placed therein is viewed from above. When the saggar is placed in the powder feeding device, distances between the slit plates and a sidewall of the saggar may be substantially equal.

BRIEF DESCRIPTION OF DRAWINGS

FIG. 4 shows relationships between distances between slit plates and a sidewall of the saggar and homogeneousness of sintered powder.

FIG. 5 shows relationships between thicknesses of slit plates and homogeneousness of sintered powder and relationships between the thicknesses of slit plates and pressing force of a pressing plate.

FIG. 7 shows relationships between taper angles $\alpha$ at the lower ends of the slit plates and abrasion resistance of the slit plates and relationships between the taper angles $\alpha$ at the lower ends of the slit plates and pressing force of a pressing device.

FIG. 10 shows relationships between taper angles $\beta$ at lower ends of the slit plates and abrasion resistance of the slit plates and relationships between the taper angles $\beta$ at the lower ends of the slit plates and pressing force of a pressing device.

DETAILED DESCRIPTION

Figure 1:
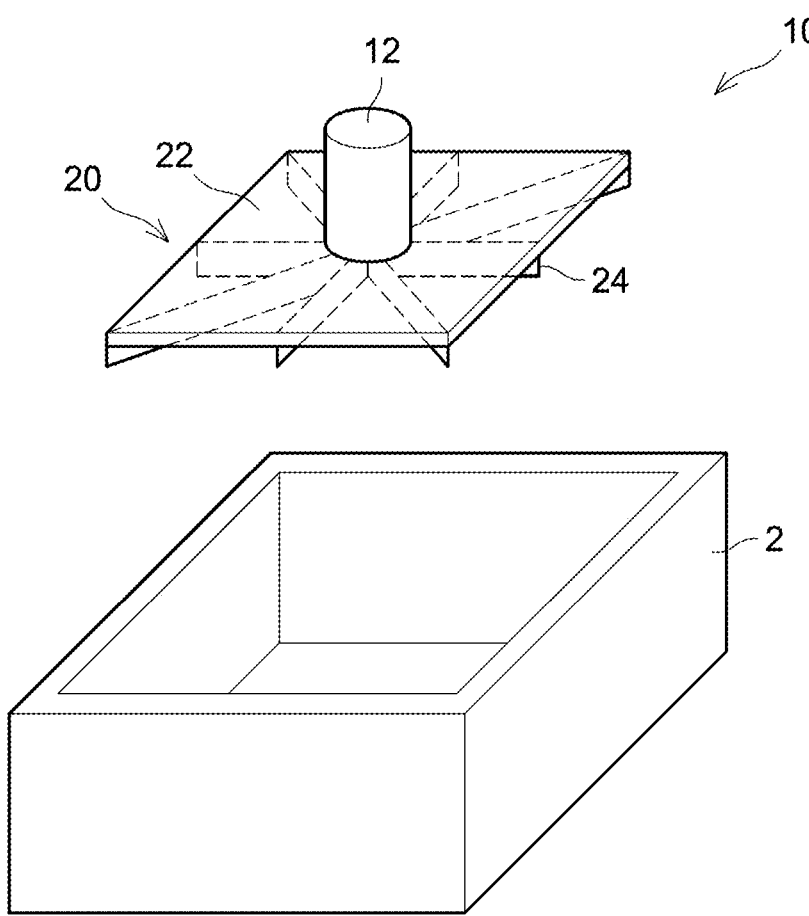
FIG. 1 schematically shows a perspective view of a powder feeding device according to first and second embodiments.

Some of the features characteristic to below-described embodiments will herein be listed. It should be noted that the respective technical elements are independent of one another, and are useful solely or in combinations. The combinations thereof are not limited to those described in the claims as originally filed.

In a first aspect of the technology disclosed herein, a powder feeding device may be configured to fill a saggar with powder by compressing the powder thereinto. The powder feeding device may comprise: a pressing plate configured to compress the powder in the saggar; and a pressing mechanism configured to press the pressing plate toward the powder in the saggar. The pressing plate may comprise: a compression plate including a pressing surface that compresses the powder by contacting the powder; and a plurality of slit plates disposed on the pressing surface and extending downward from the pressing surface. The slit plates may be arranged radially as the powder feeding device with the saggar placed therein is viewed from above. When the saggar is placed in the powder feeding device, distances between the slit plates and a sidewall of the saggar may be substantially equal.

Since the distances between the slit plates and the sidewall of the saggar are substantially equal, none of the slit plates are farther away from the sidewall of the saggar when the powder is compressed. Thus, intervals between the sidewall of the saggar and slit grooves are also equal, which leads to homogeneous firing of the powder in the saggar.

In a second aspect of the technology disclosed herein according to the first aspect, the plurality of slit plates may include slit plates that coincide with at least diagonal lines of the saggar as the powder feeding device with the saggar placed therein is viewed from above. This configuration allows for formation of slit grooves near four corners of the saggar.

In a third aspect of the technology disclosed herein according to the first or second aspect, when the saggar is placed in the powder feeding device, the distances between the slit plates and the sidewall of the saggar may be 30 mm or less. This configuration allows for homogeneous firing of the powder in the saggar.

In a fourth aspect of the technology disclosed herein according to any one of the first to third aspects, a thickness of each slit plate may be 0.5 mm or more and 4 mm or less. This configuration allows for homogeneous firing of the powder in the saggar while suppressing an increase in the pressing force of the pressing mechanism.

In a fifth aspect of the technology disclosed herein according to any one of the first to fourth aspects, each slit plate may comprise a taper at a lower end of the slit plate. This configuration allows for a reduction in the pressing force of the pressing mechanism.

In a sixth aspect of the technology disclosed herein according to the fifth aspect, each taper may be defined by only one surface of the slit plate being tilted. An angle of each taper may be 20 degrees or more and 90 degrees or less.

In a seventh aspect of the technology disclosed herein according to the fifth aspect, each taper may be defined by only one surface of the slit plate being tilted. An angle of each taper may be 30 degrees or more and 85 degrees or less. This configuration allows for a further reduction in the pressing force of the pressing mechanism while maintaining sufficient abrasion resistance at the lower ends of the slit plates.

In an eighth aspect of the technology disclosed herein according to the fifth aspect, each taper may be defined by opposing surfaces of the slit plate being tilted. An angle of each taper may be 20 degrees or more and 180 degrees or less.

In a nineth aspect of the technology disclosed herein according to the fifth aspect, each taper may be defined by opposing surfaces of the slit plate being tilted. An angle of each taper may be 30 degrees or more and 170 degrees or less. This configuration allows for a further reduction in the pressing force of the pressing mechanism while maintaining sufficient abrasion resistance at the lower ends of the slit plates.

In a tenth aspect of the technology disclosed herein according to any one of the first to nineth aspects, the slit plates may be constituted of one or more materials of stainless steel, titanium, nickel, polyvinyl chloride, and tungsten carbide. In this configuration, the slit plates are unlikely to be abraded when the slit plates are inserted into the powder. Thus, abrasion particles generated due to abrasion of slit plates are unlikely to contaminate the powder.

Further, even when the abrasion particles from the slit plates contaminate the powder (i.e., powder before firing), this does not adversely affect the quality of the sintered powder after firing.

In an eleventh aspect of the technology disclosed herein according to any one of the first to tenth aspects, surfaces of the slit plates may be buffed. This configuration reduces roughness of the surfaces of the slit plates. Thus, the surfaces of the slit plates are unlikely to be abraded, and the pressing force of the pressing mechanism is reduced.

In a twelfth aspect of the technology disclosed herein according to any one of the first to tenth aspects, surfaces of the slit plates may be coated with Teflon (registered trademark).

EMBODIMENTS

First Embodiment

Figure 2:
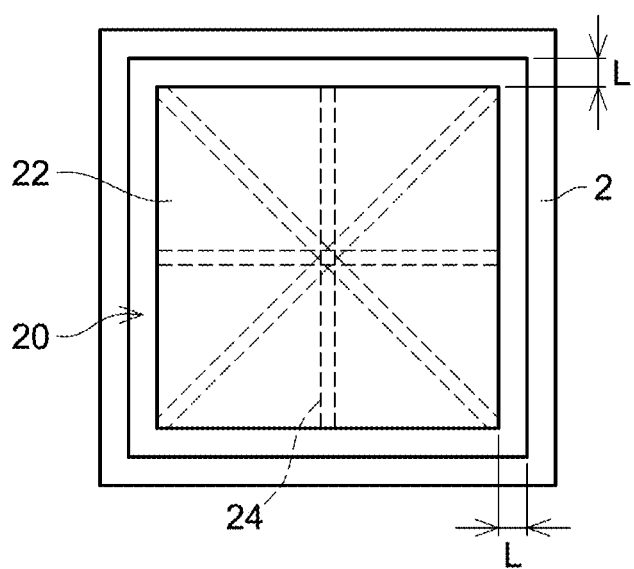
FIG. 2 shows a top view of a pressing plate and a saggar, where the pressing plate is inserted in the saggar.

Referring to the drawings, a powder feeding device 10 according to an embodiment is described. The powder feeding device 10 is used to fill a saggar 2 with powder by compressing the powder into the saggar 2. In this embodiment, the powder to be supplied into the saggar 2 is positive electrode powder material for a lithium-ion battery (which may be simply termed "powder" hereinafter). In this embodiment, as shown in FIGS. 1 and 2, the saggar 2 is substantially rectangle (specifically, substantially square) in shape as viewed from above. In this embodiment, the inner dimension of the sidewall of the saggar 2 is 306 mm per a side. The powder feeding device 10 according to this embodiment can be used to supply the powder to saggars 2 that is substantially rectangle in shape as viewed from above and has sidewall inner dimensions from 80 mm to 380 mm by compressing the powder thereinto.

Figure 3:
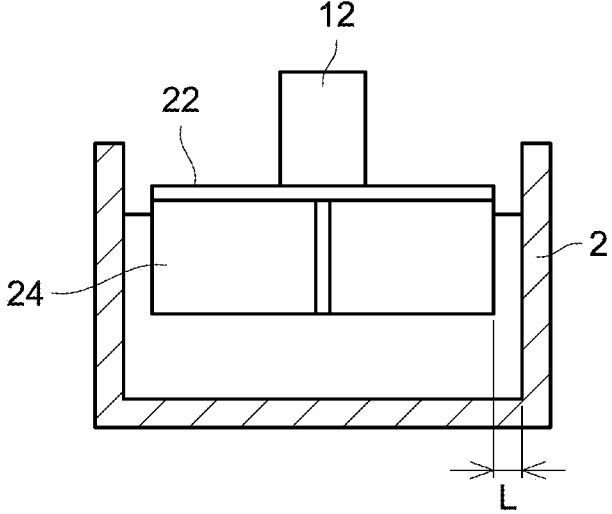
FIG. 3 shows a side view of the pressing plate and the saggar, where the pressing plate is inserted in the saggar.

As shown in FIGS. 1 to 3, the powder feeding device 10 includes a pressing plate 20 and a pressing device (that is, a pressing mechanism) 12. The pressing plate 20 is configured to compress the powder in the saggar 2. Specifically, the saggar 2 is placed on a placement surface including a positioning projection (not shown) so as to be positioned at a predetermined place on the placement surface, the pressing plate 20 is placed at a predetermined position relative to the placement surface, and the pressing plate 20 is inserted into a predetermined position within the saggar 2 on the placement surface and thereby compresses the powder in the saggar. The pressing device 12 is located on the pressing plate 20 and configured to move the pressing plate 20 toward and away from the saggar 2 (move the pressing plate 20 up and down). The powder in the saggar 2 is pressed when the pressing plate 20 moves toward the saggar 2. Detailed description for the pressing device 12 is omitted herein because any pressing devices used in publicly known powder feeding devices can be used as the pressing device 12.

The pressing plate 20 includes a compression plate 22 and a plurality of slit plates 24. As shown in FIG. 2, as viewed from above, the compression plate 22 is slightly smaller in size than the inner surface of the sidewall of the saggar 2. That is, in this embodiment, the compression plate 22 is substantially rectangular in shape and insertable in the saggar 2. When the pressing plate 20 is in the saggar 2, a distance L from the inner surface of the sidewall of the saggar 2 to the compression plate 22 is 30 mm or less. The pressing plate 20 is inserted into the saggar 2 such that the center of the compression plate 22 substantially coincides with the center of the bottom surface of the saggar 2. Thus, when the pressing plate 20 is in the saggar 2, the distance L between the compression plate 22 and the inner surface of the sidewall of the saggar 2 is 30 mm or less. As shown in FIGS. 2 and 3, the compression plate 22 is a flat plate, and its lower surface is parallel to the bottom surface of the saggar 2. The pressing device 12 is disposed on the upper surface of the compression plate 22. The powder in the saggar 2 is compressed by the compression plate 22 being moved by the pressing device 12 toward the saggar 2. By compressing the powder in the saggar 2, the saggar 2 can be filled with a larger amount of powder, and thus the larger amount of powder can be fired efficiently.

The plurality of slit plates 24 is disposed on the lower surface of the compression plate 22. The slit plates 24 are flat plates and perpendicular to the lower surface of the compression plate 22. That is, the slit plates 24 extend downward from the lower surface (i.e., pressing surface) of the compression plate 22. The slit plates 24 have the same height dimension. As shown in FIG. 2, the slit plates 24 are arranged radially as viewed from above. At least four of the slit plates 24 extend from the center of the compression plate 22 toward the corners thereof as viewed from above. That is, when the pressing plate 20 is inserted into the saggar 2, these slit plates 24 are positioned to coincide with diagonal lines connecting the corners of the rectangle bottom surface of the saggar 2. In this embodiment, there are eight slit plates 24 and they extend from the center of the compression plate 22 toward the periphery thereof. Among the eight slit plates 24, four slit plates 24 extend up to the corners of the compression plate 22, respectively, while the other four slit plates 24 extend up to the midpoints of the sides of the compression plate 22, respectively.

When the powder in the saggar 2 is pressed by the pressing plate 20, the plurality of slit plates 24 of the pressing plate 20 forms a plurality of grooves in the powder. Compressing the powder in the saggar 2 allows the saggar 2 to be filled with a larger amount of powder, whereas that adversely makes it harder to remove the sintered powder from the saggar 2 after firing. However, the plurality of grooves formed in the powder when the powder is compressed facilitates the removal of sintered powder from the saggar 2 after firing. Further, compressing the powder in the saggar 2 also hinders gases required for firing reactions from reaching deep inside the powder, and also hinders reaction gases generated during the firing of the powder from escaping to the outside of the saggar 2. Especially, it is harder for reaction gases generated near the bottom surface of the saggar 2 to escape to the outside of the saggar 2. However, the plurality of grooves formed in the powder when the powder is compressed facilitates the escape of the reaction gases generated near the bottom surface of the saggar 2, and thus the powder in the saggar 2 can be homogeneously fired.

The slit plates 24 extend from the center of the compression plate 22 up to the side surfaces thereof. Therefore, when the powder in the saggar 2 is pressed by the pressing plate 20, the distances L between ends of the slit plates 24 (i.e., ends of the slit plates 24 at the side surfaces of the compression plate 22) and the side surface of the saggar 2 are 30 mm or less. Thus, the grooves are formed even in a portion of the powder near the side surface of the saggar 2, which allows gases required for firing reactions to reach deep inside the powder and also allows reaction gases generated near the side surface of the saggar 2 to escape. Thus, heterogeneousness is suppressed between firing of a portion of the powder near the center of the saggar 2 and firing of a portion of the powder near the side surface of the saggar 2.

In this embodiment, the plurality of slit plates 24 includes eight slit plates 24, however, the number of slit plates 24 is not particularly limited as long as the slit plates 24 include ones extending to the corners of the compression plate 22. For example, the plurality of slit plates 24 may include only four slit plates 24 extending to the corners of the compression plate 22. Alternatively, the plurality of slit plates 24 may include 16 slit plates 24, namely the eight slit plates 24 in this embodiment plus additional eight slit plates 24 between the eight slit plates 24.

The slit plates 24 are constituted of a metal material. In this embodiment, the slit plates 24 are constituted of stainless steel. Alternatively, the slit plates 24 may be constituted of a metal material or a resin material. For example, the slit plates 24 may be constituted of titanium, nickel, polyvinyl chloride (PVC), or tungsten carbide. Constituting the slit plates 24 of any of the above-listed materials provides abrasion resistance to the slit plates 24, which reduces the chance of contaminating the powder by abrasion particles generated by abrasion of the slit plates 24 when the pressing plate 20 presses the powder in the saggar 2. Further, surfaces of the slit plates 24 are buffed. This reduces surface roughness of the slit plates 24 and thus reduces the chance of surface abrasion of the slit plates 24. Further, even when the abrasion particles from the slit plates contaminate the powder (i.e., powder before firing), the quality of the sintered powder after firing is not thereby affected. Buffing the surfaces of the slit plates 24 also allows for a reduction in the pressing forces of the pressing device 12. The surfaces of the slit plates 24 may be coated with a coating material that enables a reduction in surface roughness of the slit plates 24. For example, the surfaces of the slit plates 24 may be coated with Teflon (registered trademark).

The configuration of the slit plates 24 is described in more detail. As described, when the pressing plate 20 is in the saggar 2, the distances L between the slit plates 24 and the side surface (inner wall) of the saggar 2 are 30 mm or less. FIG. 4 shows relationships between the distances L between the slit plates 24 and the side surface of the saggar 2 and homogeneousness of the sintered powder after firing. The homogeneousness of the sintered powder after firing was assessed as below. After firing, multiple samples were taken from a portion of the powder near the center of the saggar 2 and a portion of the powder near the side surface of the saggar 2, and then lithium contents in the respective samples were measured. The sintered powder after firing was determined as homogeneous when the difference in the lithium contents of the samples was equal to or less than a threshold, whereas the sintered powder after firing was determined heterogeneous when the difference in the lithium contents of the samples was above the threshold.

As shown in FIG. 4, the homogeneousness of the sintered powder after firing was assessed for cases of the distance L between the slit plates 24 and the side surface of the saggar 2 being 1 mm, 2 mm, 5 mm, 10 mm, 20 mm, 30 mm, and 40 mm. For the cases of the distance L between the slit plates 24 and the side surface of the saggar 2 being 1 mm to 10 mm, the sintered powder was homogenous. For the cases of the distance L between the slit plates 24 and the side surface of the saggar 2 being 20 mm to 30 mm, the sintered powder was not completely homogeneous but was almost homogeneous. For the case of the distance L between the slit plates 24 and the side surface of the saggar 2 being 40 mm, the sintered powder was inhomogeneous. This inhomogeneous sintered powder could have been caused because gases required for firing reactions, such as oxygen, could not be supplied to the entire powder due to the lack of grooves formed by the slit plates 24 near the side surface of the saggar 2 and because reaction gases generated near the side surface of the saggar 2 could not sufficiently escape. From the above, it has been confirmed that the powder in the saggar 2 can be fired homogeneously with the distance L between the slit plates 24 and the side surface of the saggar 2 being 30 mm or less, more preferably 10 mm or less. The lower limit value for the distance L between the slit plates 24 and the side surface of the saggar 2 may be any value as long as the slit plates 24 do not interfere with the saggar 2 when the pressing plate 20 presses the powder in the saggar 2. For example, the lower limit value may be 1 mm. Alternatively, the lower limit value for the distance L between the slit plates 24 and the side surface of the saggar 2 may be between 0 mm and 1 mm as long as the slit plates 24 do not interfere with the saggar 2 when the pressing plate 20 presses the powder in the saggar 2.

The thickness of each slit plate 24 is 0.5 mm or more and 4 mm or less. The thickness of the slit plates 24 is constant. FIG. 5 shows relationships between thicknesses of the slit plates 24, homogeneousness of the sintered powder after firing, and pressing force of the pressing device 12. The pressing force of the pressing device 12 is a pressing force required to insert the slit plates 24 into the powder in the saggar 2. In the table shown in FIG. 5, the mark×(unsuitable) indicates that a large pressing force was required.

As shown in FIG. 5, the homogeneousness of the sintered powder after firing and the pressing force were assessed for cases of the thickness of the slit plates 24 being 0.3 mm, 0.5 mm, 1 mm, 2 mm, 2.5 mm, 3 mm, 4 mm, and 5 mm. For the case of the thickness of the slit plates 24 being 0.3 mm, the sintered powder was inhomogeneous. For the case of the thickness of the slit plates 24 being 0.5 mm, some sintered powder was homogeneous, but some other sintered powder was inhomogeneous. For the cases of the thickness of the slit plate 24 being 1 mm to 5 mm, the sintered powder was homogeneous. The inhomogeneous sintered powder in the case of the thickness of the slit plates 24 being 0.3 mm could have been caused because the width of grooves formed in the powder was so narrow due to the small thickness of the slit plates 24 that the narrow grooves vanished or were even narrowed during a time period from the completion of powder filling by the powder feeding device 10 to the beginning of the firing process (during the transfer to a firing process) and/or during the firing process. The inhomogeneous sintered powder in the case of the thickness of the slit plates 24 being 0.5 mm could have been caused for the same reason. From the above, it has been confirmed that the powder in the saggar 2 can be fired homogeneously with the thickness of the slit plates 24 being 0.5 mm or more, more preferably 1 mm or more.

For the cases of the thickness of the slit plates 24 being 0.3 mm to 3 mm, the slit plates 24 could be inserted into the powder with a suitable pressing force, without a need to increase the size of the pressing device 12. For the case of the thickness of the slit plates 24 being 4 mm, the size of the pressing device 12 had to be increased to insert the slit plates 24 into the powder. For the case of the thickness of the slit plates 24 being 5 mm, the size of the pressing device 12 had to be significantly increased to insert the slit plates 24 into the powder, thus the insertion of the slit plates 24 was practically difficult. From the above, it has been confirmed that the slit plates 24 with the thickness of 0.5 mm to 4 mm, more preferably 0.5 mm to 3 mm can be inserted into the powder.

Second Embodiment

Figure 6:
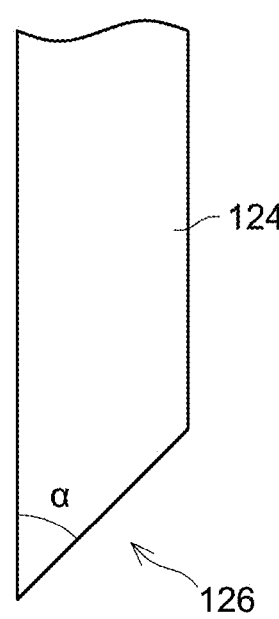
FIG. 6 shows a side view of a lower end of a slit plate in the powder feeding device according to the second embodiment.

In the first embodiment, the thickness of each slit plate 24 is constant, however, this need not be the case. For example, as shown in FIG. 6, each slit plate 124 may include a taper 126 at its lower end. In this embodiment, the taper 126 of each slit plate 124 is defined by only one surface of the slit plate 124 being tilted. The tapers 126 at the lower ends of the slit plates 124 facilitate the insertion of the slit plates 124 into the powder and allow for a reduction in the pressing force of the pressing device 12.

An angle α of the tapers 126 at the lower ends of the slit plates 124 is 20 degrees or more and 90 degrees or less. FIG. 7 shows relationships between the angles α of the tapers 126 of the slit plates 124, abrasion resistance of the slit plates 124, and pressing force of the pressing device 12.

As shown in FIG. 7, the abrasion resistance of the slit plates 124 and the pressing force were assessed for cases of the angle α of the tapers 126 being 10 degrees, 20 degrees, 25 degrees, 30 degrees, 45 degrees, 60 degrees, 75 degrees, 85 degrees, 88 degrees, and 90 degrees (i.e., without the tapers 126). For the case of the angle α of the tapers 126 being 10 degrees, the lower ends of the slit plates 124 were easily damaged when the pressing plate 20 was inserted into the saggar 2 because the slit plates 124 each had a larger thin region at the lower end. For the cases of the angle α of the tapers 126 being 20 degrees to 25 degrees, the lower ends of the slit plates 124 were barely damaged when the pressing plate 20 was inserted into the saggar 2, which means the slit plates 124 were resistant to abrasion. For the cases of the angle α of the tapers 126 being 30 degrees to 90 degrees, the lower ends of the slit plates 124 were not damaged when the pressing plate 20 was inserted into the saggar 2, which means the slit plates 124 were sufficiently resistant to abrasion. From the above, it has been confirmed that the slit plates 124 having the tapers 126 with the angle α of 20 degrees or more, more preferably 30 degrees or more are sufficiently resistant to abrasion upon the insertion of the pressing plate 20 into the saggar 2.

For the cases of the angle α of the tapers 126 being 10 degrees to 85 degrees, the slit plates 124 could be inserted into the powder with a suitable pressing force. For the cases of the angle α of the tapers 126 being 88 degrees to 90 degrees, the slit plates 124 could be inserted into the powder with a suitable pressing force but this pressing force was larger than the pressing force required in the cases of the angle α of the tapers 126 being 10 degrees to 85 degrees. The slit plates 124 with the angle α of 90 degrees have the same configuration as that of the slit plates 24 without tapers described in connection with the first embodiment. That is, the slit plates 124 including the tapers 126 with the angle α of 10 degrees to 85 degrees could be inserted into the powder with a smaller pressing force than the pressing force required to insert the slit plates 24 without tapers into the powder. From the above, it has been confirmed that the slit plates 124 including the tapers 126 with the angle α of 10 degrees to 85 degrees can be inserted into the powder in the saggar 2 with a small pressing force.

Figure 8A:
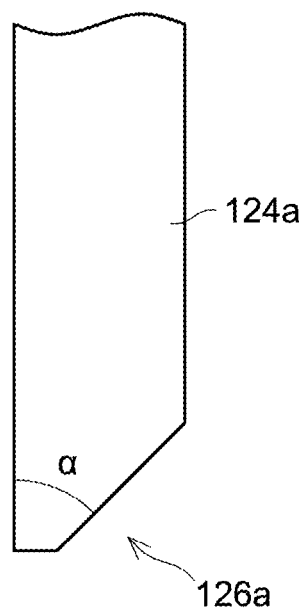
FIGS. 8A and 8B show side views of lower ends of other exemplary slit plates in the powder feeding device according to the second embodiment.
Figure 8B:
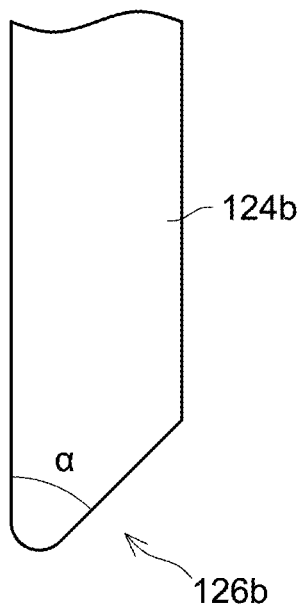

In this embodiment, the lower ends of the slit plates 124 are sharp due to the tapers 126, however, this need not be the case. For example, as shown in FIG. 8A, each slit plate 124a may include a chamfered taper 126a that is flat at the lower end of the slit plate 124a. Alternatively, as shown in FIG. 8B, each slit plate 124b may include a rounded taper 126b that is curved at the lower end of the slit plate 124b. As with the slit plates 124 including the sharp tapers 126, the slit plates 124a including the chamfered tapers 126a and the slit plates 124b including the rounded tapers 126b also allow for a reduction in the pressing force required to insert the pressing plate 20 into the saggar 2. Further, the lower ends of the slit plates 124a including the chamfered tapers 126a and the lower ends of the slit plates 124*b* including the rounded tapers 126*b* are less likely to be damaged when the pressing plate 20 is inserted into the saggar 2 and thus more resistant to abrasion than the slit plates 124 including the sharp tapers 126.

Third Embodiment

Figure 9:
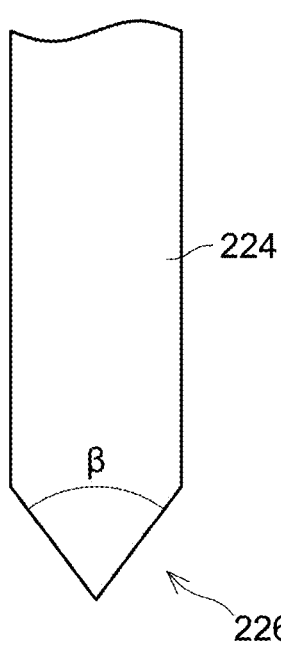
FIG. 9 shows a side view of a lower end of a slit plate in a powder feeding device according to a third embodiment.

In the second embodiment, the tapers 126 of the slit plates 124 are each defined by only one surface of the slit plate 124 being tilted, however, this need not be the case. For example, as shown in FIG. 9, each slit plate 224 may include a taper 226 defined by opposing surfaces of the slit plate 224 being tilted. In this embodiment, an angle β of the tapers 226 at the lower ends of the slit plates 224 is 20 degrees or more and 180 degrees or less. FIG. 10 shows relationships between the angles β of the tapers 226 of the slit plates 224, abrasion resistance of the slit plates 224, and pressing force of the pressing device 12.

As shown in FIG. 10, the abrasion resistance of the slit plates 224 and the pressing force were assessed for cases of the angle β of the tapers 226 being 10 degrees, 20 degree, 25 degrees, 30 degrees, 60 degrees, 90 degrees, 120 degrees, 150 degrees, 170 degrees, 175 degrees, and 180 degrees (i.e., without the tapers 226). For the case of the angle β of the tapers 226 being 10 degrees, the lower ends of the slit plates 224 were easily damaged when the pressing plate 20 was inserted into the saggar 2 because each slit plate 224 had a larger thin region at its lower end. For the cases of the angle β of the tapers 226 being 20 degrees to 25 degrees, the lower ends of the slit plates 224 were barely damaged when the pressing plate 20 was inserted into the saggar 2, which means the slit plates 224 were resistant to abrasion. For the cases of the angle β of the tapers 226 being 30 degrees to 180 degrees, the lower ends of the slit plates 224 were not damaged when the pressing plate 20 was inserted into the saggar 2, which means the slit plates 224 were sufficiently resistant to abrasion. From the above, it has been confirmed that the slit plates 224 including the tapers 226, which are defined by opposing surfaces of the slit plates 224 being tilted, with the angle β of 20 degrees or more, more preferably 30 degrees or more are sufficiently resistant to abrasion.

For the cases of the angle β of the tapers 226 being 10 degrees to 170 degrees, the slit plates 224 could be inserted into the powder with a suitable pressing force. For the cases of the angle β of the tapers 226 being 175 degrees to 180 degrees, the slit plates 224 could be inserted into the powder with a suitable pressing force but this pressing force was larger than the pressing force required to insert the slit plates 224 including the tapers 226 with the angle β of 10 degrees to 170 degrees. The slit plates 224 including the tapers 226 with the angle β of 180 degrees have the same configuration as that of the slit plates 24 without tapers described in connection with the first embodiment. That is, the slit plates 224 including the tapers 226 with the angle β of 10 degrees to 170 degrees could be inserted into the powder with a smaller pressing force than the pressing force required to insert the slit plates 24 without tapers into the powder. From the above, it has been confirmed that the slit plates 224 including the tapers 226 with the angle β of 10 degrees to 170 degrees can be inserted into the powder in the saggar 2 with a smaller pressing force.

In this embodiment, each slit plate 224 includes the taper 226 defined by the opposing surfaces of the slit plate 224 being tilted at the same angle, however, this need not be the case. The slit plates 224 may have any configurations as long as they include tapers with the angle β. That is, the taper of each slit plate may be defined by one surface of the slit plate being tilted at an angle and the opposite surface being tilted at a different angle, as long as the tilt angle of the one surface and the tilt angle of the opposite surface amount to the angle β.

Figure 11A:
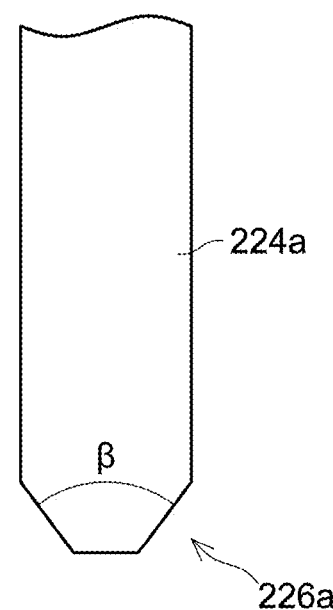
FIGS. 11A and 11B show side views of lower ends of other exemplary slit plates in the powder feeding device according to the third embodiment.
Figure 11B:
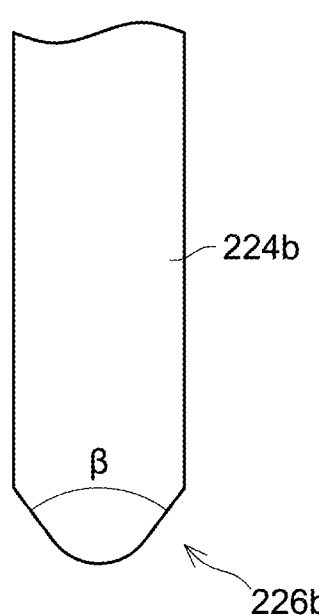

In this embodiment, the lower ends of the slit plates 224 including the tapers 226 may not be sharp. For example, as shown in FIG. 11A, each slit plate 224*a* may include a chamfered taper 226*a* that is flat at the lower end of the slit plate 224*a*. Alternatively, as shown in FIG. 11*b*, each slit plate 224*b* may include a rounded taper 226*b* that is curved at the lower end of the slit plate 224*b*. The slit plates 224*a* including the chamfered tapers 226*a* and the slit plates 224*b* including the rounded tapers 226*b* allow for a reduction in the pressing force required to insert the pressing plate 20 into the saggar 2 and improve abrasion resistance.

Specific examples of the disclosure herein have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the purpose of the examples illustrated by the present description or drawings is to satisfy multiple objectives simultaneously, and satisfying any one of those objectives gives technical utility to the present disclosure.

What is claimed is:

1. A powder feeding device configured to fill a saggar with powder by compressing the powder thereinto, the powder feeding device comprising:
   a pressing plate configured to compress the powder in the saggar; and
   a pressing mechanism configured to press the pressing plate toward the powder in the saggar,
   wherein
   the pressing plate comprises:
      a compression plate including a pressing surface that compresses the powder by contacting the powder; and
      a plurality of slit plates disposed on the pressing surface and extending downward from the pressing surface,
   the slit plates are arranged radially as the powder feeding device with the saggar placed therein is viewed from above,
   when the saggar is placed in the powder feeding device, distances between the slit plates and a sidewall of the saggar are substantially equal,
   when the saggar is placed in the powder feeding device, the distances between the slit plates and the sidewall of the saggar is 30 mm or less, and
   each of the slit plates comprises a chamfered or rounded taper having an angle of 20 degrees or more at a lower end thereof.

2. The powder feeding device according to claim 1, wherein the plurality of slit plates includes slit plates that coincide with at least diagonal lines of the saggar as the powder feeding device with the saggar placed therein is viewed from above.

3. The powder feeding device according to claim 1, wherein a thickness of each of the slit plates is 0.5 mm or more and 4 mm or less.

4. The powder feeding device according to claim 1, wherein the taper of each of the slit plates is defined by only one surface of the slit plate being tilted, and an angle of the taper of each of the slit plates is 20 degrees or more and 90 degrees or less.

5. The powder feeding device according to claim 1, wherein the taper of each of the slit plates is defined by only one surface of the slit plate being tilted, and an angle of the taper of each of the slit plates is 30 degrees or more and 85 degrees or less.

6. The powder feeding device according to claim 1, wherein the taper of each of the slit plates is defined by opposing surfaces of the slit plate being tilted, and an angle of the taper of each of the slit plates is 20 degrees or more and less than 180 degrees.

7. The powder feeding device according to claim 1, wherein the taper of each of the slit plates is defined by opposing surfaces of the slit plate being tilted, and an angle of the taper of each of the slit plates is 30 degrees or more and 170 degrees or less.

8. The powder feeding device according to claim 1, wherein the slit plates are constituted of one or more materials selected from the group consisting of stainless steel, titanium, nickel, polyvinyl chloride, and tungsten carbide.

9. The powder feeding device according to claim 1, wherein surfaces of the slit plates are buffed.

10. The powder feeding device according to claim 1, wherein surfaces of the slit plates are coated with polytetrafluoroethylene.

* * * * *